United States Patent
Tóth et al.

(10) Patent No.: US 6,597,106 B2
(45) Date of Patent: Jul. 22, 2003

(54) COMPACT FLUORESCENT LAMP WITH A HOUSING STRUCTURE

(75) Inventors: László Tóth, Budapest (HU); Ferenc Papp, Budapest (HU); József Fülöp, Budapest (HU)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 09/750,944

(22) Filed: Dec. 28, 2000

(65) Prior Publication Data

US 2002/0084743 A1 Jul. 4, 2002

(51) Int. Cl.[7] .................................................. H01J 1/62
(52) U.S. Cl. .................... 313/490; 313/318.04; 313/46; 362/218
(58) Field of Search ................................ 313/490, 493, 313/624, 634, 489, 318.04, 25, 46, 11, 318.01; 362/216, 218

(56) References Cited

U.S. PATENT DOCUMENTS

| | | | |
|---|---|---|---|
| 4,694,215 A | 9/1987 | Hofmann | 313/44 |
| 4,794,301 A | 12/1988 | Misono et al. | 313/490 |
| 5,446,340 A | * 8/1995 | Parillo et al. | 313/493 |
| 5,717,277 A | 2/1998 | Siminovitch | 313/318.02 |

* cited by examiner

Primary Examiner—Robert H. Kim
Assistant Examiner—Elizabeth Gemmell
(74) Attorney, Agent, or Firm—Fay, Sharpe, Fagan, Minnich & McKee, LLP

(57) ABSTRACT

A compact fluorescent lamp comprises a plastic housing. The plastic housing includes a plastic cap and a plastic shell. A discharge tube extends from the plastic housing through openings formed in the plastic cap. The compact fluorescent lamp further comprises a tubulation which contains amalgam material and communicates with the discharge tube. A heat conducting means is integrally formed with the plastic housing which is suitable for receiving a heat conductive material forming a thermal bridge towards the tubulation.

10 Claims, 2 Drawing Sheets

COMPACT FLUORESCENT LAMP WITH A HOUSING STRUCTURE

FIELD OF THE INVENTION

This invention relates to a compact fluorescent lamp with a housing structure, and, more particularly, to a structure for drawing excess heat from the discharge tube of the compact fluorescent lamp.

BACKGROUND OF THE INVENTION

Mercury dosed single-ended low-pressure discharge lamps, commonly referred to as compact fluorescent lamps, have a widespread use both for indoor and outdoor lighting. The advantage of these light sources is that they can be operated more economically than other conventional light sources due to their long life and their low power consumption. The luminous output of these lamps however highly depends on the partial pressure of the mercury which is effected by the temperature of the discharge space. Due to a higher ambient temperature, the discharge space may be overheated which causes the partial pressure of the mercury to rise above an optimum value. Consequently, the luminous flux of the lamp will be lower than the luminous flux available at optimum temperature range.

Several constructions have been created for obtaining the required pressure of the mercury so far. The principle of these constructions is that the partial pressure of the mercury can be adjusted by producing a so-called cold spot in the discharge tube where the excess mercury condenses so that the luminous efficiency approaches the optimum value. U.S. Pat. No. 5,717,277 describes a construction for compact fluorescent lamps in which vertical and horizontal insulating elements are positioned in the housing of the lamp in order to provide a cold spot in a tubulation placed at the end of the discharge tube. U.S. Pat. No. 4,694,215 offers a different construction which defines the mercury vapor pressure by providing for a predetermined temperature cold spot within the fluorescent lamp. The lamp allows vertical cooling air to stream from a lower opening to an upper outlet in the housing. In the so-called "base-down" operation, in which the lamp operates in vertical position so that he base is the lowest point, the mercury within the fill of the fluorescent lamp may condense. The mercury collects as mercury drops in the cooled tubulation thereby stabilizing the vapor pressure within the discharge vessel.

A disadvantage of these fluorescent lamps is that the location of the cold spot varies according to the operating position of the lamp. The operating position has a great impact on the luminous output of the lamp. Another disadvantage is that the mercury, which continuously vapors and condenses, may, under some operating conditions, even make flaking or removal of the fluorescent material with which the inside of the discharge vessel is coated. Furthermore, the optimum temperature range of such lamps is narrow for many applications. In order to overcome this difficulty, fluorescent lamps with amalgam droplets were developed in which the excess mercury is amalgamated in these droplets. Fluorescent lamps using amalgam present a wider optimum temperature range allowing a broader scale of application.

In many cases, this broader scale is not sufficient especially when the lamp is located in recessed fixture or it is furnished with outer bulb which increase the ambient temperature locally. U.S. Pat. No. 4,794,301 describes a fluorescent lamp with outer bulb which incorporates a quantity of amalgam held within a tubulation placed at the end of the discharge tube. The tubulation protrudes into an air chamber on the wall of which inlets and outlets are formed in order to maintain air ventilation for cooling the amalgam. A disadvantage of these lamps is, that communication with the atmosphere requires inlets and outlets which prevent the lamp from being used in outdoor application. Another drawback of the compact fluorescent lamps using ventilation slits that they can meet the safety requirements only by meticulous design. Depending on the application, i.e. the ambient temperature and the fixture type in which the lamp is used, a very wide optimum operation temperature range is needed. Comparing a stand-alone lamp operating at ambient temperature of 0° C., e.g. in a garage, and a lamp in a recessed fixture, e.g. on a ceiling, the ambient temperature ranges from 0° C. to 70° C. Practically, compact fluorescent lamps with amalgam cannot even cover this wide temperature range.

Thus there is a particular need for a compact fluorescent lamp structure which enables the lamp to operate in a very wide range of optimum temperature. It is therefore desirable to provide a compact fluorescent lamp with amalgam the thermal optimum of which can be shifted towards higher ambient temperatures and which maintains the optimum luminous output in a larger variety of applications.

BRIEF SUMMARY OF THE INVENTION

In an exemplary embodiment of the present invention, a compact fluorescent lamp comprises a plastic housing. The plastic housing includes a plastic cap and a plastic shell. A discharge tube extends from the plastic housing through openings formed in the plastic cap. The compact fluorescent lamp further comprises a tubulation which contains amalgam material and communicates with the discharge tube. A heat conducting means is integrally formed with the plastic housing which is suitable for receiving a heat conductive material forming a thermal bridge towards the tubulation.

This construction has the following advantages over the prior art. When the heat conducting means integrally formed with the plastic housing receives a heat conductive material, the plastic housing serves as a heat sink and heat radiating body which allows the lamp to operate with optimum luminous output at higher ambient temperatures. This offers several additional possibility of application for the lamp, e.g. in recessed ceiling or built-in fixtures in counter-ceilings. The heat conducting means may be filled with heat conductive material easily before the final step of lamp assembly. Since the presence of the heat conductive material is optional, a wide ambient temperature range with optimum luminous output is accomplished. The abandonment of the heat conductive material results in a lamp operating with optimum luminous output in a lower ambient temperature place, e.g. in a garage.

DETAILED DESCRIPTION OF THE INVENTION

Figure 1:
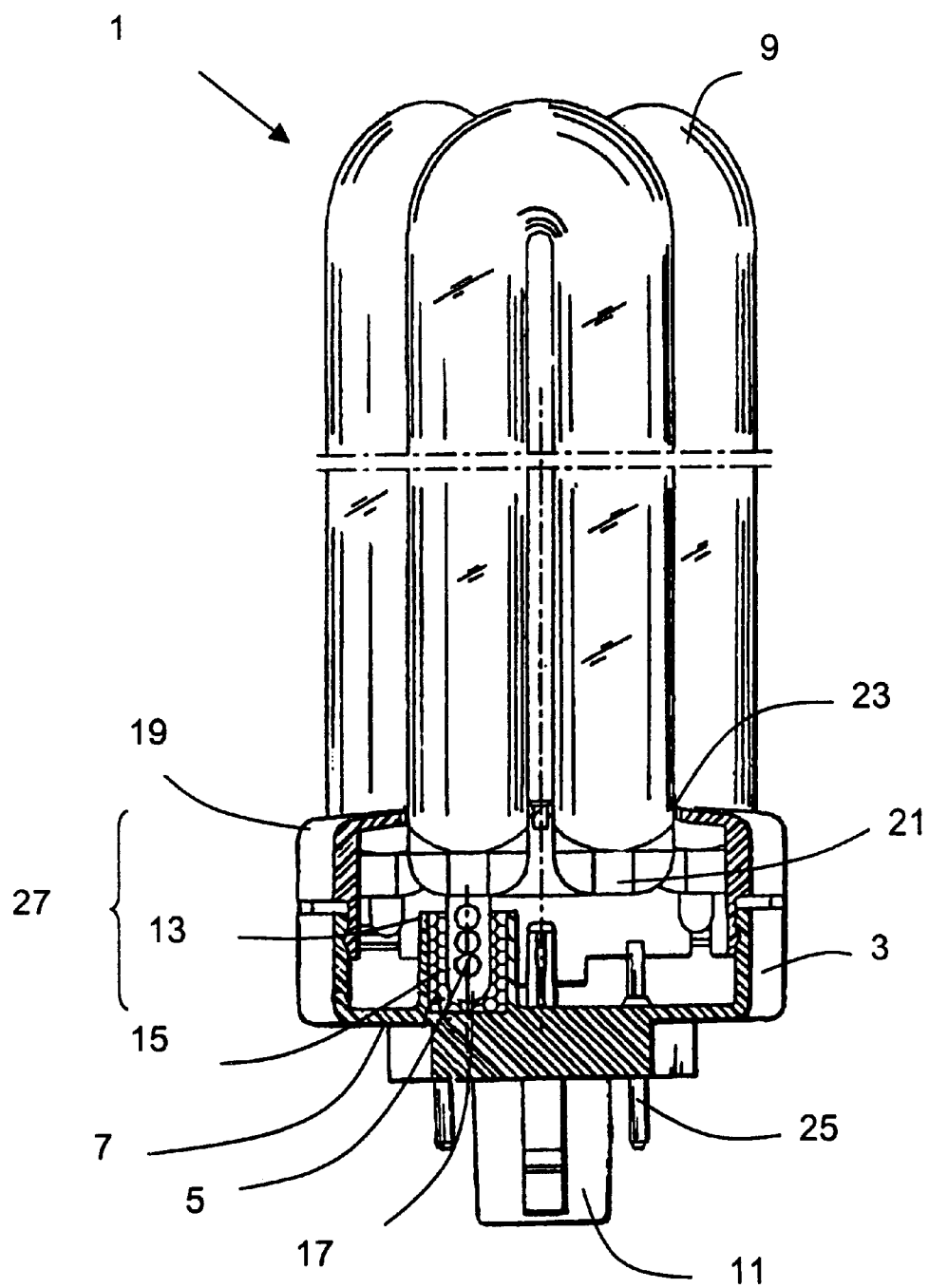
FIG. 1 is a schematic side view and partly axial section of a compact fluorescent lamp in which the present invention is embodied.

FIG. 1 illustrates a compact fluorescent lamp 1 which comprises a discharge tube 9 and a housing 27. The housing 27 includes a shell 3 and a cap 19. The shell 3 and the cap 19 are fitted to each other at their circumferential edges. The discharge tube 9 includes three U-shape tube sections the ends 21 of which are bridged to each other in order to create a continuous path for the discharge arc. The discharge tube 9 is filled with noble gas and mercury and its tube sections are sealed at their ends 21. These ends 21 of the U-shape tube sections protrude into the inner space of the housing 27 through openings 23 formed on the top of the cap 19 of the housing 27 and are fixed firmly therein. One end of a tube section is furnished with a tubulation 17 communicating with the discharge tube 9. The tubulation 17 is filled with amalgam pellets 5 and extends down towards the bottom of the shell 3. The amalgam pellets 5 are seated in the lower end of the tubulation 17.

Around the tubulation 17, a heat conducting means is arranged which is formed from the bottom of the shell 3 as a plastic extension 13 protruding from an inner surface portion of the shell 3 and having a cavity therein. The cavity accepts the tubulation 17 with a gap. The gap between the outside surface of the tubulation 17 and the inside surface of the cavity of the plastic extension 13 is filled with heat conductive material 15. This heat conductive material 15 can be made of heat conductive paste or adhesive material or any other heat conductive substance which can be dosed in figurable, soft shape. For example, silicon paste can be a preferable material which is widely used for heat transfer in the electrical industry. The plastic extension 13 together with the heat conductive material 15 creates a thermal bridge which transfers the heat from the tubulation 17 to the surface 7 of the lamp 1 thereby decreasing the temperature of the amalgam pellets 5. So, the plastic housing 27 serves as a heat sink and heat radiating body as well.

The cross section of the plastic extension 13, i.e. its section which is substantially perpendicular to the tubulation 17 can be circular, rectangular, elliptical or can be of any other shape. Since the plastic extension 13 is formed integrally with the housing 27, it makes a heat conductive means which conducts the heat to the surface 7 of the plastic housing 27. In other possible embodiments, the heat conducting means is a plastic chamber formed on an inner surface portion of the shell 3 or the cap 19, e.g. it is formed as a nest on the side wall or on the mantle of the plastic housing 27.

The shell 3 is provided with electrical connection means 25 which makes an electrical connection to the socket (not shown). Although in the embodiment shown in FIG. 1 the lamp has a plug-in base 11, lamps with screw-in base still remain within the scope of the present invention.

By the compact fluorescent lamp structure, in which the present invention is embodied, two different lamps 1 with similar construction can be manufactured in order to cover a wide scale of application: a lamp with the heat conductive material 15 which fits to a higher ambient temperature and base-down applications, and a lamp without heat conductive material which fits to lower ambient temperature applications and base-up position. When lamps for use in a higher ambient temperature or base-down application are intended to be manufactured, the heat conducting means will be filled with heat conductive material 15. This arrangement allows more intensive heat transfer from the tubulation 17 containing the amalgam pellets 5 to the outer surface 7 of the housing 27. As a result, the temperature of the amalgam will be decreased significantly with respect to the amalgam temperature of the compact fluorescent lamps without heat conductive material. On the other hand, in the case of manufacturing lamps for use in a lower ambient temperature application, e.g. for garage or outdoor lighting or for base-up application, the heat conducting means will not be filled with heat conductive material 15. By this method, the heat generated in the discharge tube 9 of the lamp will be transferred less intensively from the housing 27 so that the lamp can operate with optimum luminous output at lower ambient temperature.

Figure 2:
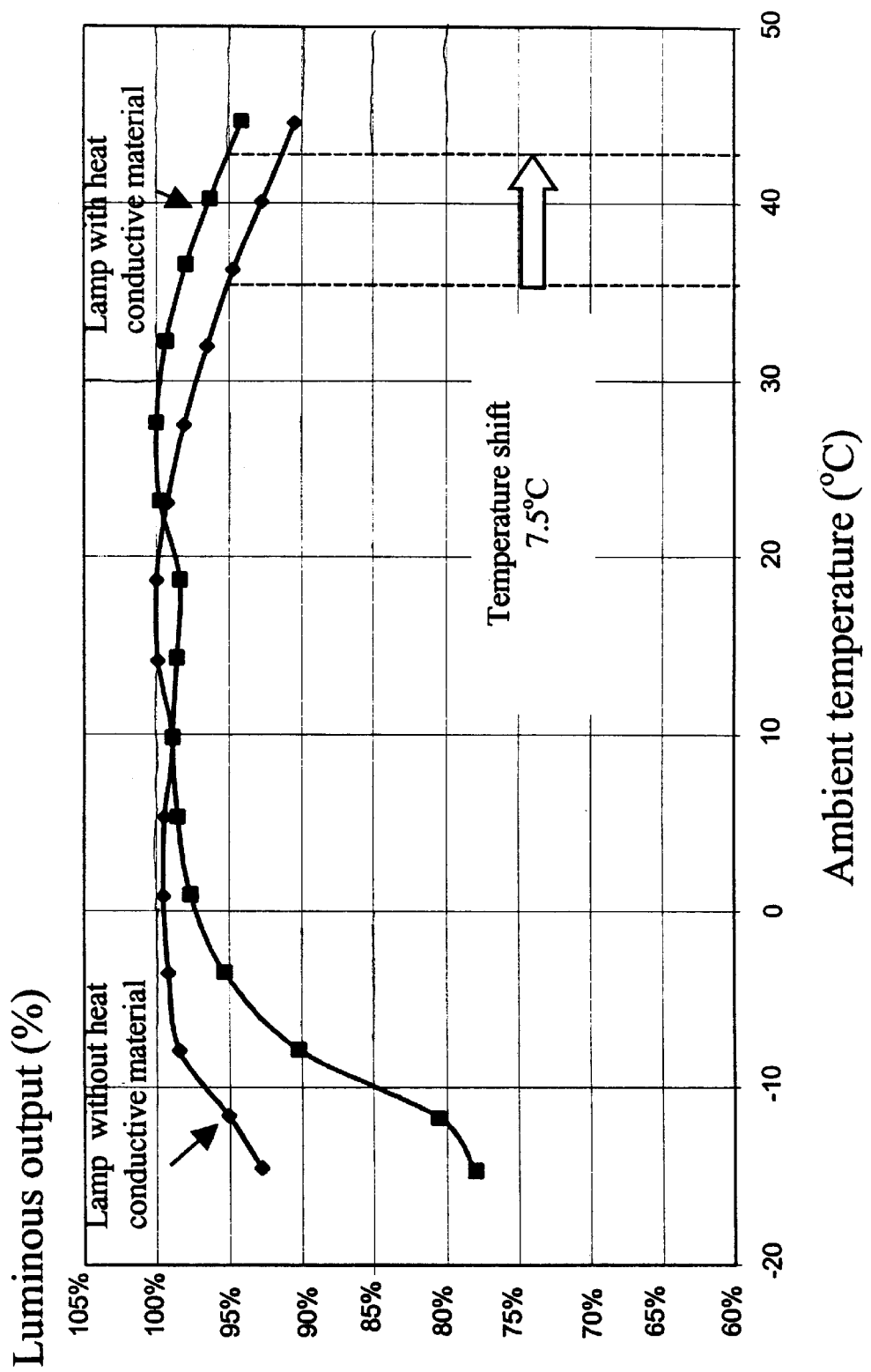
FIG. 2 is a chart showing the luminous output of a lamp with and a lamp without heat conductive material as a function of the ambient temperature.

FIG. 2 is a chart which illustrates the luminous output of a lamp in which the present invention is embodied. The luminous output is shown as a function of the ambient temperature for lamps with heat conductive material and for lamps without heat conductive material. The luminous output is measured in relative units in which the maximum value is counted as 100%. The ambient temperature is measured in degrees centigrade. Considering the 95% luminous output value, the corresponding ambient temperatures are about 7.5° C. higher for the lamp with heat conductive material. It means, that using the heat conductive material 15 between the tubulation 17 and the plastic extension 13, the optimum temperature range is shifted by 7.5° C. towards the higher temperatures. In the chart, the dotted lines illustrate that the upper ambient temperature limit at which a 95% luminous output is still measured moves from about 36° C. to 42° C. thereby affording a chance for the additional applications mentioned above.

What is claimed is:

1. A compact fluorescent lamp comprising a plastic housing including a plastic cap and a plastic shell, a discharge tube extending from the plastic housing through openings formed in the plastic cap, a tubulation containing amalgam material and communicating with the discharge tube, and a heat conducting means integrally formed with the plastic housing and suitable for receiving a heat conductive material forming a thermal bridge towards the tubulation.

2. The compact fluorescent lamp of claim 1 in which the heat conducting means is integrally formed with the plastic shell.

3. The compact fluorescent lamp of claim 1 in which the heat conducting means is integrally formed with the plastic cap.

4. The compact fluorescent lamp of claim 1 in which the heat conducting means is a plastic chamber formed on an inner surface portion of the plastic housing and surrounding the tubulation with a gap at least partly.

5. The compact fluorescent lamp of claim 1 in which the heat conducting means is a plastic extension protruding from an inner surface portion of the plastic housing and having a cavity therein for accepting the tubulation with a gap at least partly.

6. The compact fluorescent lamp of claim 5 in which the gap is filled with a heat conductive paste.

7. The compact fluorescent lamp of claim 6 in which the heat conductive paste is a silicon paste.

8. The compact fluorescent lamp of claim 5 in which the gap is filled with a heat conductive adhesive material.

9. The compact fluorescent lamp of claim 1 in which said lamp is a plug-in type lamp.

10. The compact fluorescent lamp of claim 1 in which said lamp is a screw-in type lamp.

* * * * *